July 3, 1951 J. G. JACOB 2,559,160
APPARATUS FOR PUSHING FISH TAPE THROUGH CONDUITS
Filed Nov. 5, 1948
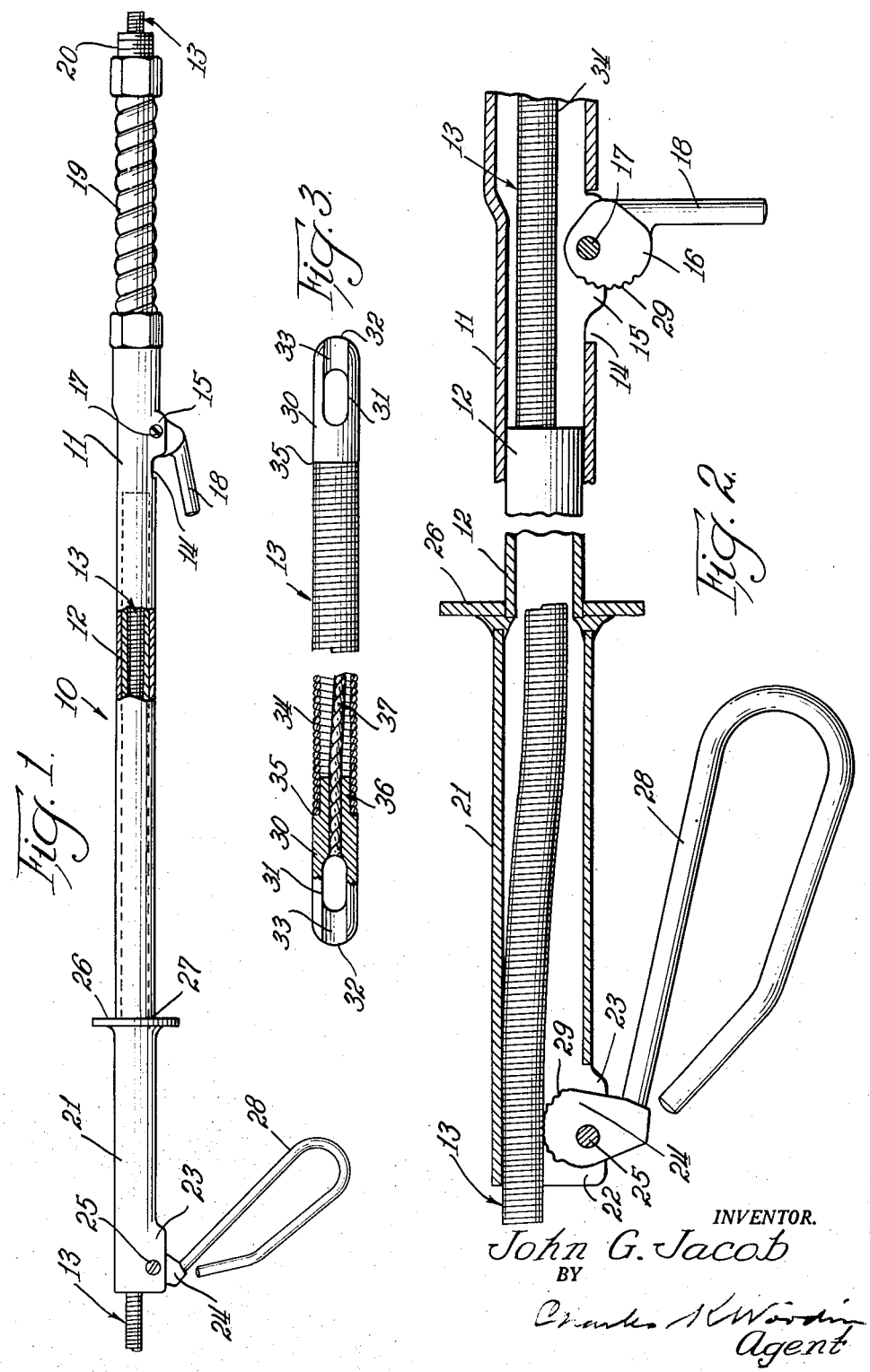
INVENTOR.
John G. Jacob
BY
Charles K Wording
Agent Patented July 3, 1951

2,559,160

UNITED STATES PATENT OFFICE 2,559,160

APPARATUS FOR PUSHING FISH TAPE THROUGH CONDUITS

John G. Jacob, Morton, Ill.

Application November 5, 1948, Serial No. 58,375

7 Claims. (Cl. 175—376)

This invention pertains to pushers, and particularly to apparatus for pushing fish tape through the pipe-like type of conduit used in wiring installations to enclose the electric wires.

The conduit through which the wires are pulled is usually made of tubular steel or aluminum, and, particularly in the case of conduit made from the last-mentioned metal, great difficulty is often experienced in manually passing the conventional flat steel "fish-tape" through a conduit having in it a series of bends, particularly after the usual wires have been attached to the tape for pulling into the conduit, by reason of the friction developed between the tape and the inner surfaces of the conduit.

Accordingly, objects of the invention are to provide a tool of simple construction whereby a tape may be guided while being forcibly pushed through a conduit; and also to provide an overall apparatus of the general class indicated hereinabove including a flexible element serving the purposes of the usual steel "fish-tape" which is so formed as to substantially reduce friction between itself and the interior surfaces of the conduit, making for ease and speed of insertion and withdrawal and thereby making possible wire pulls through conduit of extreme angularity or length.

Still other and further objects of the invention will be apparent from the detailed description which follows and from the drawings, in which:

Fig. 1 is a side elevational view of a complete apparatus of the invention;

Fig. 2 is a fragmentary cross-sectional view of the device of Fig. 1; and

Fig. 3 is a fragmentary view, partially in section, of a flexible element of preferred type for use in the overall structure.

Referring now to the drawings, reference numeral 10 indicates generally the tool portion of the apparatus of the invention which comprises an outer hollow cylindrical member 11 telescoped and slidably guided within which is an inner hollow cylindrical member 12. Inserted within the hollow interior of inner cylindrical member 12 through a part of the hollow interior of cylindrical member 11 and the hereinafter described neck portion attached to the latter is a flexible element or tape 13 which preferably is formed to have as its outside a helical coil, as shown, but which, obviously, may be any type having suitable conduit-following characteristics and dimensions.

As shown in Fig. 1, in the most compact or fully telescoped position of cylindrical members 11 and 12, the outer end of the latter terminates considerably short of the full length of the first-mentioned member. Forwardly of the inner end of inner cylindrical portion 12 outer cylindrical portion 11 is provided with an aperture 14, a part of the metal sheared to form which being bent outwardly to form opposed parallel ears 15—15 and between which is positioned a cam 16 eccentrically swingably mounted on a suitable transverse pin 17. Cam 16 has a handle or lever 18 attached thereto.

Attached to the fore-end of cylindrical member 11 is a hollow flexible neck portion 19 having a reduced annular end 20 which is preferably of such a dimension as to be insertable into the open end of a piece of conduit, or the like.

As shown at the left hand portions of Figs. 1 and 2, cylindrical portion 12 has a handle portion 21 rigidly attached thereto, handle portion 21 being provided with an end recess 22. A part of the metal excised to form recess 22 is bent outwardly to form opposed parallel ears 23, 23 between which is positioned a cam 24 swingably and eccentrically carried by a suitable transverse pin 25. Cam 24 has a handle or lever 28 attached thereto.

If desired, cams 16 and 24 each may be provided with serrated flexible element-impinging surfaces such as those indicated at 29.

At its forepart handle portion 21 has an annular outwardly directed hand guard 26 forming abutment which in the most telescoped position of the tool portion of the device contacts the inner end 27 of outer cylindrical member 11 limiting the extent of telescopability of the cylindrical members and protecting the hand of the user from being pinched when the tool is operated.

Referring now to Fig. 3, the preferred type of flexible element or tape 13 for use with the hereinabove described tool comprises a structure having solid head portions 30, 30, each porvided with an ovular transversely directed aperture 31 and each having a rounded end 32, as shown. Communicating between the outer ends of each aperture 31 and the rounded end 32 of each head 30 are longitudinally directed opposed recesses 33, 33, for reception of electric wires, only one of each of which is seen in Fig. 3.

Extending between the inner ends of heads 30, 30 is a tightly wound continuous helical coil spring 34 which forms the outer portion of flexible element 13, the ends of spring 34 each being fixedly attached to heads 30, 30 as at 35, 35. Interiorly of spring 34 and extending throughout the length thereof and attached to each head 30 as indicated at 36 at the left hand side of Fig. 3, is a flexible cable 37. Cable 37 should preferably be of slightly greater length than helical spring 34 in order to preclude the cable from excessively inhibiting the extension of spring 34 when flexible element 13 is coiled or is passed around one or more sharply angled conduit bends. Typically, cable 37 should be about three inches longer than helical spring 34 in the proper construction of a twenty five foot length flexible element made as above described.

In use, flexible element 13 is threaded through the hollow interior portions of cylindrical members 12 and 13 and through neck 19 so that one head 30 extends a little exteriorly to tool end 20. The tool is then normally grasped by the operator, one hand so adjacent the end of member 11 as to permit the fingers to operate handle 18, the other hand being placed on handle portion 21 with the fingers so positioned as to permit them to operate handle 28. End 20 is then inserted into the end of the conduit through which the flexible element is to be pushed.

Handle 18 is then depressed sufficiently to cause cam 16 to engage flexible element 13. With handle 28 held so loosely as to preclude engagement of cam 24 with flexible element 13 inner cylindrical member 12 is slid outwardly, in this movement being guided by outer cylindrical member 11. Handle 18 is then released while handle 28 is brought upwardly to bring cam 24 into engagement with the flxible element. Then cylindrical member 12 is pushed into telescoped position in cylindrical member 11, in so doing forcing flexible element 13 into the conduit a distance corresponding to the amount of movement given cylindrical member 12. The manipulation outlined above obviously will force flexible element forwardly into the conduit and is continued until flexible element 13 has been passed into the conduit to an opening in the latter, at which point electric wires may be looped through head opening 31.

From the above description it will be apparent that the structures of the invention well achieve those objects set forth with respect to them, and having described my invention in considerable detail, I do not wish this exactness of disclosure to be taken in a limiting, but rather in an illustrative sense desiring to be limited only as I may be by the scope of the appended claims.

Although I have described my invention as applied to wire pulling for electrical installations, it will be obvious that it may be more broadly applied—in fact to any application requiring the forcing of the flexible element in closed spaces such as water and sewage piping, flues and the like.

I claim:

1. In a fish tape pusher, a pair of hollow cylindrical members telescopable and longitudinally slidable upon one another throughout a substantial portion of their lengths, and cam means each connected with a side portion of each member and radially operable for alternate engagement with a flexible element extensible through the hollowed interiors of said members as the latter are slid longitudinally of one another.

2. A fish tape pusher, comprising a pair of mutually cooperating housing members movable inwardly and outwardly with respect to each other, said members each having a side opening therein, a flexible element guidedly carried by said members in longitudinally slidable relation, and grip means carried by each member for engagement through said side openings therein at predetermined times with said flexible element, one of said last-named means being released from and the other being engaged with said flexible element during movement of said members with respect to each other, thereby advancing or retracting said flexible element as desired.

3. A fish tape pusher comprising a pair of mutually cooperating members movable inwardly and outwardly with respect to each other, said members having wall openings, a flexible element guidedly carried by said members in longitudinally slidable relation, means limiting the extent of movement of said members with respect to each other, and means carried by each member and operable through the wall openings of said members for engagement with said flexible element, one of said last-named means being released during movement of said members with respect to each other while the other is engaged with said flexible element.

4. In a fish tape pusher, an outer tube, a flexible section upon the rear end of said tube to provide a flexible guide, said outer tube having an opening spaced inwardly of said flexible section, a gripping member pivoted to said tube adjacent said opening and operable therethrough for engaging a fish tape disposed within said tube, an inner tube slidably mounted within said outer tube and having a tubular handle section upon its front end terminating in a collar abutting the front end of said outer tube for limiting the relative telescopic movements of said tubes, said handle section having an opening, and a gripping member pivoted adjacent said opening and adapted for engaging therethrough to contact said fish tape within said tubes.

5. In a fish tape pusher, an outer tube having a flexible section upon its rear end and having a side opening adjacent said section, a gripping member pivoted in said opening and adapted for gripping a fish tape within said tube, an inner tube having a portion extending in telescopic relation with the outer tube and an exposed portion extending beyond the front end of said outer tube, said exposed portion having hand guard means arranged for abutting contact with the front end of said outer tube, said inner tube having an opening therein disposed in spaced relation to said outer tube opening, and fish tape gripping elements pivoted in said openings and coactively operable into said tubes for controlling the movement of said fish tape therethrough.

6. In a fish tape pusher, a pair of closed wall tubes arranged in telescopic relation, said tubes each having a side wall opening therethrough, a fish tape extending through said tubes and spanning said openings, and separately operable gripping means connected with each of said tubes and adjacent the respective openings therein, said gripping means each having a cam radially operable through its adjacent tube opening for selectively forcing said fish tape against the tube wall to frictionally grip said tape thereagainst.

7. In a fish tape pusher, a pair of closed wall tubes arranged in telescopic relation, said tubes each having a side wall opening therethrough, a fish tape extending through said tubes and spanning said openings, and separately operable gripping means connected with each of said tubes and adjacent the respective openings therein, said gripping means each having a cam radially operable through its adjacent tube opening for selectively forcing said fish tape against the tube wall to frictionally grip said tape thereagainst, and stop means on one of said tubes to limit the telescopic nesting of both of said tubes, said means providing a hand guard as a shield to protect the hand during the manipulation of the telescoping tubes while actuating the tape therethrough by means of said gripping means.

JOHN G. JACOB.

REFERENCES CITED

The following references are of record in the file of this patent:

UNITED STATES PATENTS

| Number | Name | Date |
|---|---|---|
| 273,295 | Lytle | Mar. 6, 1883 |
| 1,015,893 | Keeler | Jan. 30, 1912 |
| 1,505,638 | Glass | Aug. 19, 1924 |
| 1,675,738 | Titcomb | July 3, 1928 |
| 1,880,431 | Goodall | Oct. 4, 1932 |
| 1,959,490 | Mistelski | May 22, 1934 |